United States Patent
Fujii et al.

(10) Patent No.: US 8,117,391 B2
(45) Date of Patent: Feb. 14, 2012

(54) STORAGE SYSTEM AND DATA MANAGEMENT METHOD

(75) Inventors: Masanori Fujii, Odawara (JP); Tsukasa Nishimura, Odawara (JP); Sumihiro Miura, Odawara (JP); Yoshinori Okubo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 634 days.

(21) Appl. No.: 12/299,616

(22) PCT Filed: Oct. 8, 2008

(86) PCT No.: PCT/JP2008/068690
§ 371 (c)(1),
(2), (4) Date: Nov. 5, 2008

(87) PCT Pub. No.: WO2010/041345
PCT Pub. Date: Apr. 15, 2010

(65) Prior Publication Data
US 2010/0293331 A1   Nov. 18, 2010

(51) Int. Cl.
*G06F 11/00* (2006.01)
*G06F 12/00* (2006.01)
*G06F 13/00* (2006.01)
*G06F 13/28* (2006.01)

(52) U.S. Cl. .................. 711/119; 711/129; 714/22

(58) Field of Classification Search .......... 711/103, 711/118, 119, 129; 714/22
See application file for complete search history.

(56) References Cited

U.S. PATENT DOCUMENTS

| 5,519,831 | A | 5/1996 | Holzhammer | |
|---|---|---|---|---|
| 2003/0041215 | A1 | 2/2003 | George et al. | |
| 2003/0095463 | A1* | 5/2003 | Shimada et al. | 365/228 |
| 2004/0103238 | A1* | 5/2004 | Avraham et al. | 711/102 |
| 2006/0015683 | A1* | 1/2006 | Ashmore et al. | 711/113 |

FOREIGN PATENT DOCUMENTS

| GB | 2256735 | 12/1992 |
|---|---|---|
| JP | 2004-021811 | 1/2004 |

OTHER PUBLICATIONS

Intl. Search Report in PCT/JP2008/068690, dated Jun. 23, 2009 (3 pgs.); Written Opinion of the International Search Authority (6 pgs.).

* cited by examiner

*Primary Examiner* — Jared Rutz
*Assistant Examiner* — Ryan Bertram
(74) *Attorney, Agent, or Firm* — Antonelli, Terry, Stout & Kraus, LLP.

(57) ABSTRACT

A storage system, which is coupled to a computer, includes a storage device, a controller, a plurality of cache memory units, and a connecting unit. Each of the plurality of cache memory units includes: a cache memory for storing data; an auxiliary storage device for holding a content of data even after shutdown of power; and a cache controller for controlling an input/output of data to/from the cache memory and the auxiliary storage device. The cache controller store data stored in the cache memory, which is divided into a plurality of parts, into a plurality of the auxiliary storage devices included in the plurality of cache memory units.

8 Claims, 12 Drawing Sheets

STORAGE SYSTEM AND DATA MANAGEMENT METHOD

TECHNICAL FIELD

This invention relates to a storage system for storing data according to an instruction from a computer, in particular, a technology of managing data stored in a cache memory.

BACKGROUND ART

In a storage system according to a conventional technology, data written from a host computer is written into a cache memory before being written onto a disk drive. The moment that the data is written into the cache memory, the storage system notifies the host computer that a write process has been completed, which improves responsiveness to the host computer.

A DRAM is generally used as the cache memory in terms of the number of times that a read/write is performed and an access speed. Therefore, the data stored in the cache memory volatilizes (disappears) when power to the storage system is shut down, which necessitates backup of data (dirty data) before being written onto the disk drive by supplying power from a battery in case of service interruption.

Further, JP 2004-21811 A discloses a storage system in which a non-volatile memory is used as a cache memory to thereby prevent data from volatilizing (disappearing) even when power is shut down.

DISCLOSURE OF THE INVENTION

According to the above-mentioned conventional technology, data stored in a cache memory can be read by detaching the cache memory or a non-volatile memory (cache memory package) which is subjected to backup by a battery, leading to leakage of the data stored in the cache memory, which raises a problem in terms of security.

Further, if dirty data stored in a DRAM is backed up by supplying power from a battery, a capacity of the battery needs to be increased depending on the period of time necessary for backup in case of service interruption, which raises a problem of an increase in cost of the battery.

Further, in a case where a flash memory is used as the cache memory, the flash memory is slower in access speed than the DRAM, which raises a problem of a decrease in response (response to host computer of storage system) of the cache memory.

Therefore, there is desired a storage system capable of backing up dirty data even in case of long-term service interruption without decreasing the response to the host computer of the storage system.

A representative example of this invention will be described as follows. Specifically, a storage system, which is coupled to a computer, includes: a storage device for storing data for which write is requested by the computer; a controller for controlling transfer of data in the storage system; a plurality of cache memory units for temporarily storing data to be stored into the storage device; and a connecting unit for connecting at least the plurality of cache memory units. Each of the plurality of cache memory units includes: a cache memory for storing data; an auxiliary storage device for holding data even after shutdown of power; and a cache controller for controlling an input/output of data to/from the cache memory and the auxiliary storage device. The cache controller stores data stored in the cache memory, which is divided into a plurality of parts, into a plurality of the auxiliary storage devices included in the plurality of cache memory units.

Further, according to another example of this invention, the storage system further includes a watch unit for watching power supplied to the plurality of cache memory packages. The cache controller stores at least one of configuration information and control information stored in the cache memory, which is divided into a plurality of parts, into the plurality of the auxiliary storage devices before the watch unit detects an abnormality in the power supplied to the plurality of cache memory units.

According to an embodiment of this invention, data stored in the original cache memory cannot be restored only with data stored in one of the auxiliary storage devices, which can ensure secrecy of data.

Further, during a normal operation, the configuration information and control information that are stored in the cache memory are stored in the auxiliary storage device, and hence it is possible to reduce an amount of data to be backed up to the auxiliary storage device when power is shut down, and to reduce a period of time required to store data in the auxiliary storage device. Accordingly, it is possible to reduce the capacity of the battery for backup of data.

BEST MODE FOR CARRYING OUT THE INVENTION

First Embodiment

Figure 1:
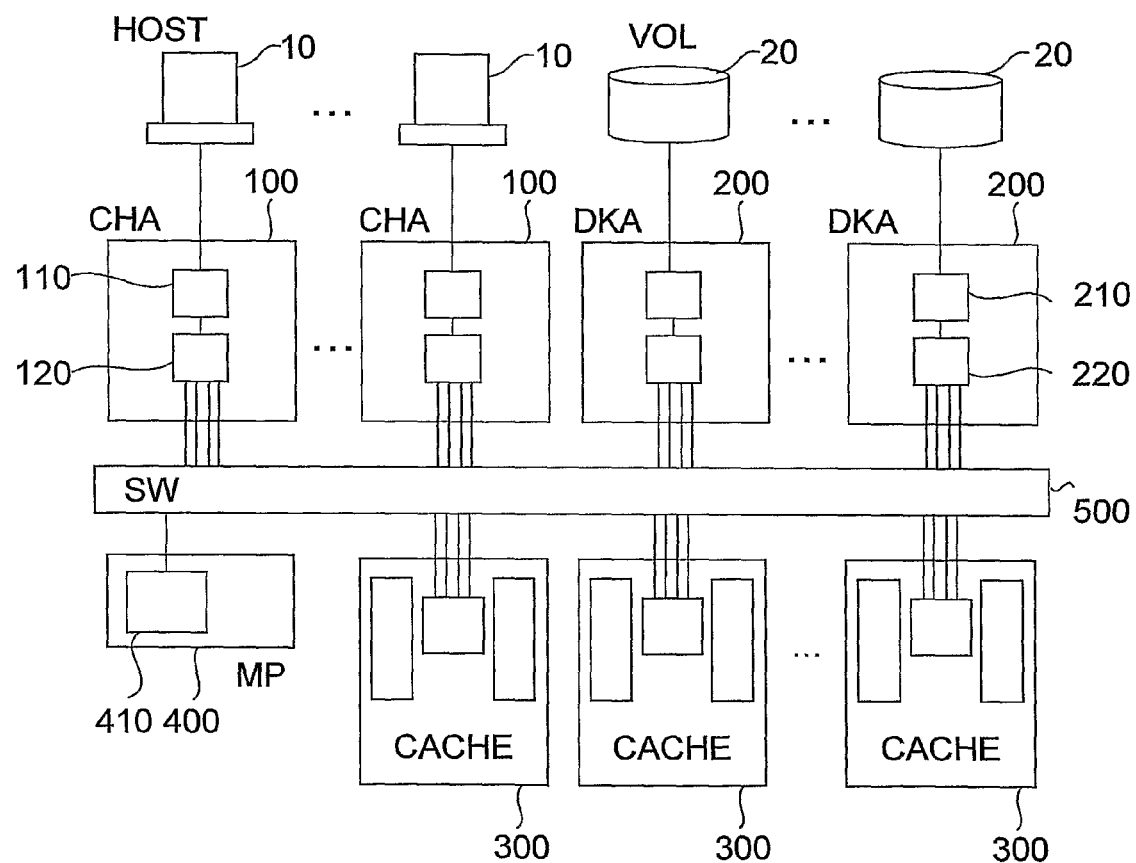
FIG. 1 is a block diagram showing a configuration of a storage system in accordance with a first embodiment of this invention.

FIG. 1 is a block diagram showing a configuration of a storage system in accordance with a first embodiment of this invention.

The storage system according to this embodiment comprises a plurality of channel adapters (CHAs) 100, a plurality of disk adapters (DKAs) 200, a plurality of cache memory packages (CACHEs) 300, and a processor package (MP) 400. The channel adapters 100, the disk adapters 200, the cache memory packages 300, and the processor package 400 are coupled to one another via a switch package (SW) 500. As shown in FIG. 1, the storage system generally includes the plurality of channel adapters 100, the plurality of disk adapters 200, and the plurality of cache memory packages 300, but may be provided with only one channel adapter 100, one disk adapter 200, and one cache memory package 300.

The channel adapter 100 comprises a protocol controller 110 for controlling a protocol for communication with a host computer 10 and a transfer controller 120 for controlling an address of data transferred from the channel adapter 100 to the cache memory package 300. The channel adapter 100 is coupled to the host computer 10 via, for example, a storage area network (SAN) that communicate by using a fibre channel protocol. It should be noted that the channel adapter 100 and the host computer 10 may be coupled to each other via Ethernet. In this case, the channel adapter 100 and the host computer 10 communicate with each other via an I-SCSI protocol.

The disk adapter 200 comprises a protocol controller 210 for controlling a protocol for communication with a disk drive 20 and a transfer controller 220 for controlling an address of data transferred from the disk adapter 200. The disk adapter 200 is coupled to the disk drive 20.

The disk drive 20 may be any one of a magnetic disk, an optical disk, a semiconductor storage device, and a magnetic tape. An interface of the disk drive 20 may be one of a fibre channel and an SATA. It should be noted that, though the disk drive 20 is shown in FIG. 1, it does not matter whether the storage system includes the disk drive 20 or the storage system includes no disk drive 20 (so-called NAS).

Figure 2:
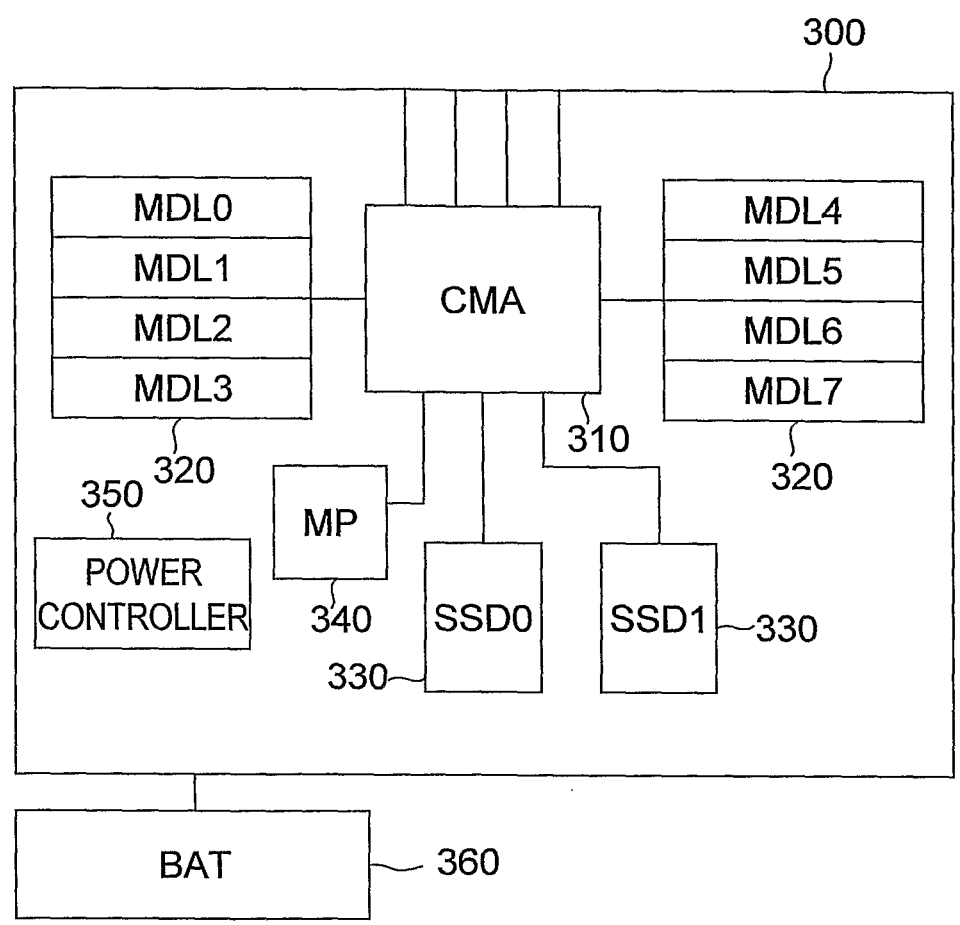
FIG. 2 is a block diagram showing a configuration of a cache memory package in accordance with the first embodiment of this invention.

The cache memory package 300 temporarily stores data for which write has been requested, and temporarily stores data read from the disk drive 20. FIG. 2 will be used to later describe a detailed configuration of the cache memory package 300.

The processor package 400 comprises a microprocessor 410. The microprocessor 410 controls an operation of the storage system (for example, transfer of data from channel adapter 100 to cache memory package 300), and manages configuration information on the storage system.

The switch package 500 comprises a switch for coupling among the channel adapter 100, the disk adapter 200, the cache memory package 300, and the processor package 400. Examples of the switch can be configured by a crossbar switch. The switch package 500 constitutes an internal network for coupling the channel adapter 100, the disk adapter 200, the cache memory package 300, and the processor package 400 with one another. The internal network is used to transfer data among those components.

The storage system may comprise an interface (SVP) to which a maintenance terminal is coupled.

When the channel adapter 100 receives a write request for data from the host computer 10, the protocol controller 110 converts the received write request into a protocol within the storage system, and transmits the write request with the protocol having been converted, to the transfer controller 120. The transfer controller 120 analyzes an address of the received write request, and transmits results of the analysis to the processor package 400. The processor package 400 determines a transfer destination of the write request (data) on the basis of the results of analyzing the address, and instructs the transfer destination to the switch package 500. The switch package 500 changes over the switch so that the data is transferred to the transfer destination specified by the processor package 400.

The write request (data) transmitted from the host computer 10 is transferred from the channel adapter 100 to the cache memory package 300, and the transferred data is temporarily stored into a cache memory 320 by a cache memory adapter 310. When the data is stored into the cache memory 320, a notification of write completion is responded to the host computer 10, which can improve performance of response to the host computer 10.

The data stored in the cache memory 320 is transferred to the disk adapter 200 by the cache memory adapter 310. The protocol controller 210 converts the transferred data into a protocol (for example, fibre channel protocol) used for transfer to the disk drive 20. The data with the protocol having been converted is written onto the disk drive 20.

FIG. 2 is a block diagram showing a configuration of the cache memory package 300 in accordance with the first embodiment of this invention.

The cache memory package 300 comprises the cache memory adapter 310, the cache memory 320, a backup memory 330, a backup memory controller 340, a power controller 350, and a battery 360.

The cache memory adapter 310 controls an input/output of data to/from the cache memory 320.

The cache memory 320 is a memory for temporarily storing data input to/output from the disk drive 20, and is generally configured by a DRAM whose access speed is high. Therefore, when power is shut down, data stored in the cache memory 320 is erased unless the cache memory 320 is backed up by supplying power from the battery 360 to the cache memory 320.

The cache memory adapter 310 stores data to be written onto the disk drive 20, into the cache memory 320. Among the data stored in the cache memory 320, data that is not written on the disk drive 20 is managed as dirty data. Accordingly, for each item of data stored in the cache memory 320, the cache memory adapter 310 manages cache memory management information in which an attribute of data (dirty data or clean data), an address thereof on the disk drive, and an address thereof in the cache memory are associated with one another.

The dirty data is stored only in the cache memory 320 within the storage system, and therefore needs to be prevented from being lost when power is shut down.

The backup memory 330 is a backup-purpose memory for preventing data stored in the cache memory 320 from being lost even when power is shut down, and is generally configured by a non-volatile memory (for example, flash memory). It should be noted that, instead of the non-volatile memory, a volatile memory (such as DRAM) to which backup power is supplied may be used as the backup memory 330. In addition, as shown in FIG. 2, a packaged solid-state disk (SSD) is preferably used as the backup memory 330.

It is preferable that a single cache memory package 300 be provided with a plurality of backup memories 330. This is because resistance to a fault is improved by making the backup memory 330 redundant, and data is transferred in parallel at high speed by defining a backup memory in which a data is to be saved for each cache memory 320.

The backup memory controller 340 controls an input/output of data to/from the backup memory 330. It should be noted that, in this embodiment, when power is shut down, the backup memory controller 340 is supplied with the power from the battery 360, and transfers data stored in the cache memory 320 for backup.

The power controller 350 watches a power supply voltage supplied to the cache memory package 300 to thereby detect shutdown of power. The battery 360 supplies power necessary for an operation of the cache memory package 300 upon the shutdown of power. It should be noted that, though the battery 360 is provided outside the cache memory package 300 in FIG. 2, the battery 360 may be provided inside the cache memory package 300.

Upon detection of the shutdown of power, the power controller 350 switches over the power so that the power from the battery 360 is supplied to each component of the cache memory package 300. It should be noted that, even if the power controller 350 does not switch over the power to the one supplied from the battery 360 when power is shut down, the power from the battery 360 may be automatically supplied to a power supply line when power is shut down with the battery 360 having such a floating configuration as to be coupled to the power supply line.

Figure 3:
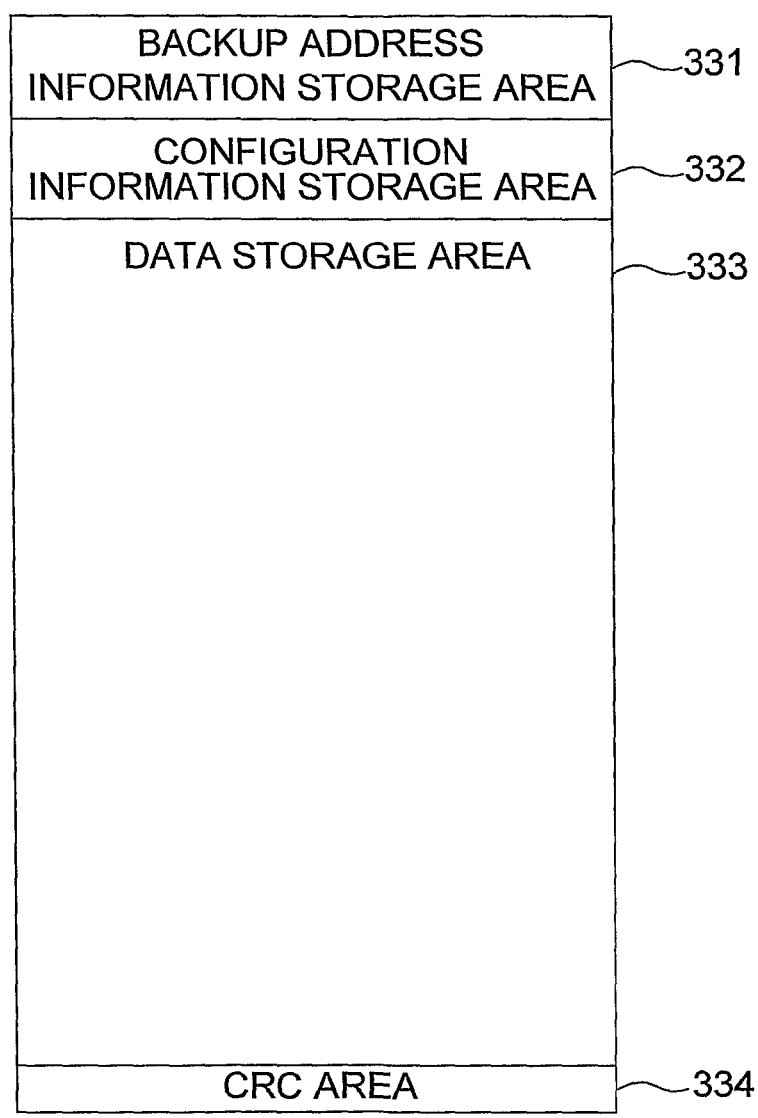
FIG. 3 is an explanatory diagram of a storage area provided to a backup memory in accordance with the first embodiment of this invention.

FIG. 3 is an explanatory diagram of a storage area provided to the backup memory 330 in accordance with the first embodiment of this invention.

The storage area of the backup memory 330 is divided into a backup address information storage area 331, a configuration information storage area 332, a data storage area 333, and a CRC area 334.

Figure 7:
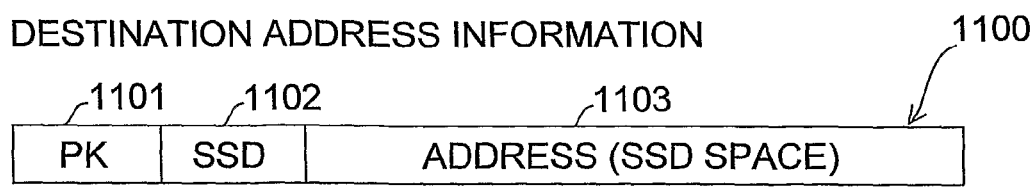
FIG. 7 is an explanatory diagram of destination address information in accordance with the first embodiment of this invention.
Figure 8:
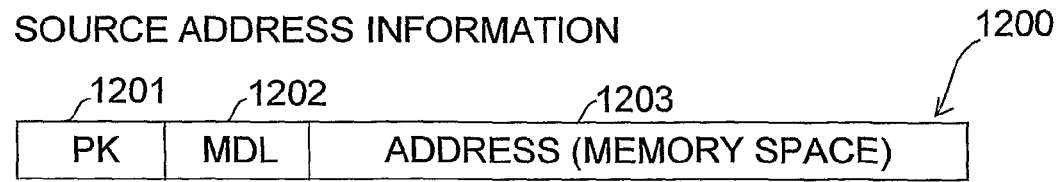
FIG. 8 is an explanatory diagram of source address information in accordance with the first embodiment of this invention.

The backup address information storage area 331 stores information indicating a correlation between an address in the cache memory 320 and an address in the backup memory 330, in other words, a pair of destination address information 1100 shown in FIG. 7 and source address information 1200 shown in FIG. 8. The configuration information storage area 332 stores configuration information on the storage system. The configuration information on the storage system includes the number of respective packages implemented in the storage system, an identifier thereof, performance information thereon, and a layout of data.

The data storage area 333 stores, for the purpose of backup, user data and control information that are stored in the cache memory 320. The CRC area 334 stores an error-checking code. It should be noted that the error-checking code may be another type than a CRC type, and an error-correcting code may be stored instead of the error-checking code.

Figure 4:
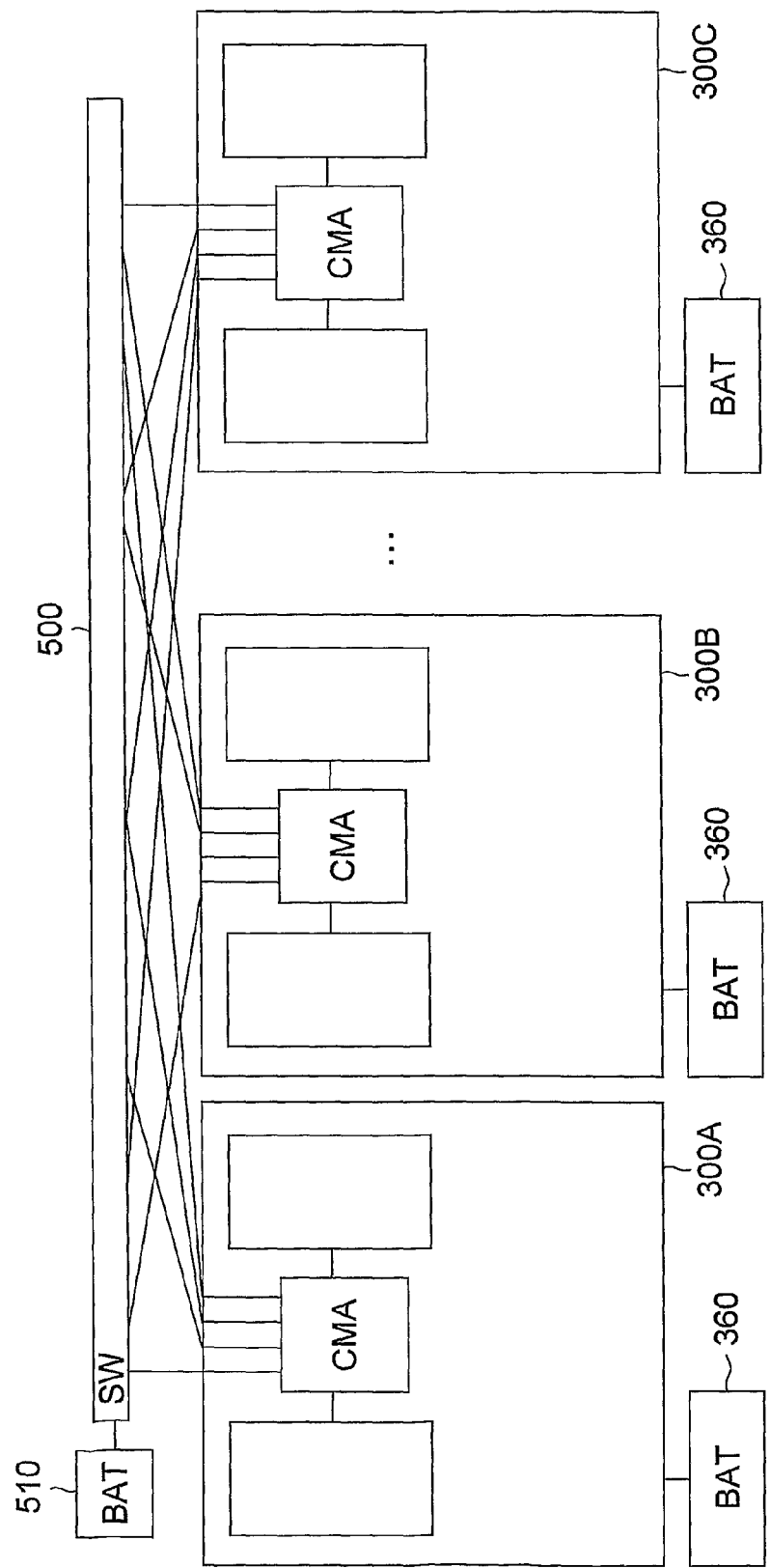
FIG. 4 is a block diagram showing a configuration of the storage system around a switch unit in accordance with the first embodiment of this invention.

FIG. 4 is a block diagram showing a configuration of the storage system around the switch package 500 in accordance with the first embodiment of this invention.

The storage system according to this embodiment comprises the plurality of cache memory packages 300 (300A, 300B, and 300C). The cache memory packages 300A, 300B, and 300C each comprise a plurality of ports, and each of the ports is coupled to the switch package 500.

Further, in the storage system according to this embodiment, as described later, the data stored in the cache memory 320 is written into the backup memory 330 when power is shut down, which means that the switch package 500 needs to operate for a predetermined period of time after the shutdown of power. Therefore, a battery 510 is coupled to the switch package 500, and even after the power to the storage system has been shut down, power is supplied from the battery 510 to the switch package 500. It should be noted that, though the battery 510 is provided outside the switch package 500 in FIG. 4, the battery 510 may be provided inside the switch package 500.

It should be noted that, as described above, each component of the cache memory package 300 is supplied with the power from the battery 360 when power is shut down.

Those backup power supplies 360 and 510 allow the cache memory package 300 and the switch package 500, respectively, to operate for a predetermined period of time after the shutdown of power to the storage system. Accordingly, the data stored in the cache memory 320 can be transferred to another cache memory package 300 via the switch package 500, and stored into the backup memory 330 of the another cache memory package 300.

Next, description will be made of redundancy of a cache memory package.

The cache memory packages 300A and 300B form a pair. In other words, the same data is stored in the cache memory 320 of the cache memory package 300A (CMPK00) and the cache memory 320 of the cache memory package 300B (CMPK01). The cache memory package 300 is thus made redundant to thereby achieve safety against data loss. In addition, loads on access are balanced to thereby improve performance of response to the host computer 10.

In this case, as described later, the data stored in the cache memory 320 of any one of the cache memory packages 300A and 300B is the only data to be stored into the backup memory 330 for backup when power is shut down.

Figure 5:
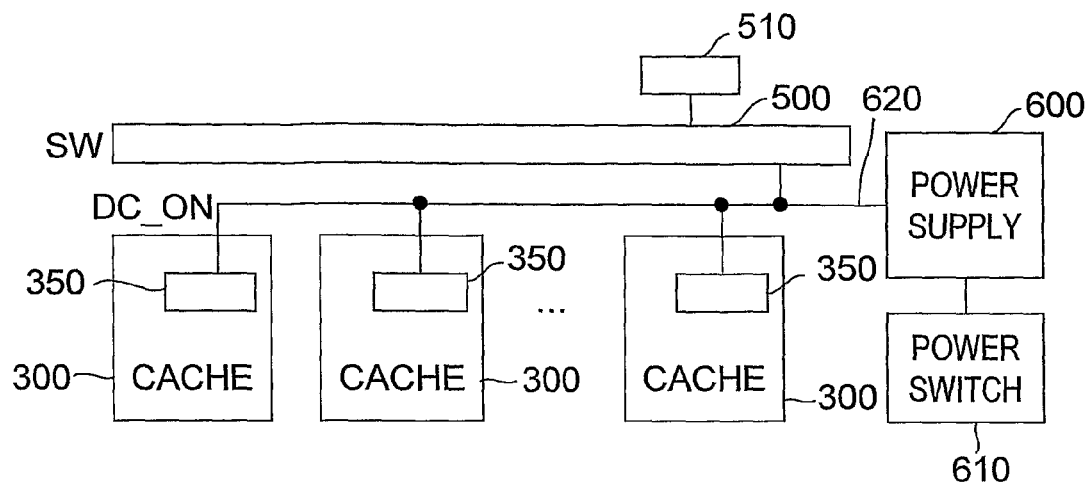
FIG. 5 is a block diagram showing a configuration of the storage system around a power supply line in accordance with the first embodiment of this invention.

FIG. 5 is a block diagram showing a configuration of the storage system around the power supply line in accordance with the first embodiment of this invention.

During a normal operation, power is supplied from a power supply 600 to the cache memory package 300 and the switch package 500. The power supply 600 converts utility power supply of alternating current to the storage system into DC power having a voltage necessary for each component of the storage system, and outputs the DC power obtained after conversion to a power supply line 620.

If a power switch 610 of the power supply 600 is shut down, if the supply of AC power to the power supply 600 is interrupted, or if the power supply 600 breaks down, a voltage applied to the power supply line 620 is decreased. The power controller 350 of the cache memory package 300 watches a power supply voltage supplied to the cache memory package 300 to thereby detect lowering of the power supply voltage.

It should be noted that, instead of the power controller 350 watching a power supply voltage, in such a configuration that the power supply 600 outputs a signal indicating a power supply abnormality, the power controller 350 may detect the decreasing of the power supply voltage by receiving the signal indicating a power supply abnormality output from the power supply 600.

Figure 6:
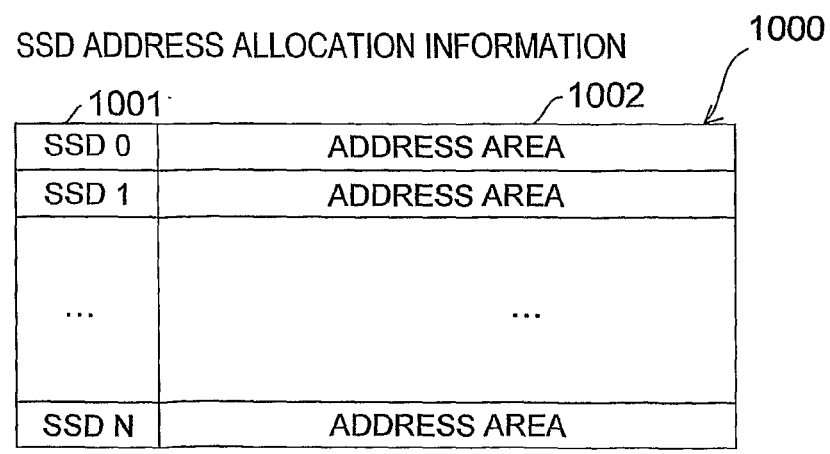
FIG. 6 is an explanatory diagram of SSD memory address allocation information in accordance with the first embodiment of this invention.

FIG. 6 is an explanatory diagram of SSD address allocation information 1000 in accordance with the first embodiment of this invention.

The SSD address allocation information 1000 is one item of the configuration information on the storage system, and is defined for each cache memory package 300. The SSD address allocation information 1000 is managed by the processor package 400.

The SSD address allocation information 1000 is information indicating an area of the backup memory 330 provided to each cache memory package 300, which is allocated to the cache memory package 300, and includes an identifier 1001 of a backup memory and an allocation address area 1002 thereof.

The identifier 1001 of a backup memory is an identifier of the backup memory 330 which is unique across the entire storage system. The allocation address area 1002 indicates an address range of the backup memory 330, which is allocated to the cache memory package 300 that uses the SSD address allocation information 1000.

In other words, each cache memory package 300 can use an address in the backup memory 330 within a range defined by the SSD address allocation information 1000 to save data stored in its own cache memory 320.

FIG. 7 is an explanatory diagram of the destination address information 1100 in accordance with the first embodiment of this invention.

Figure 9:
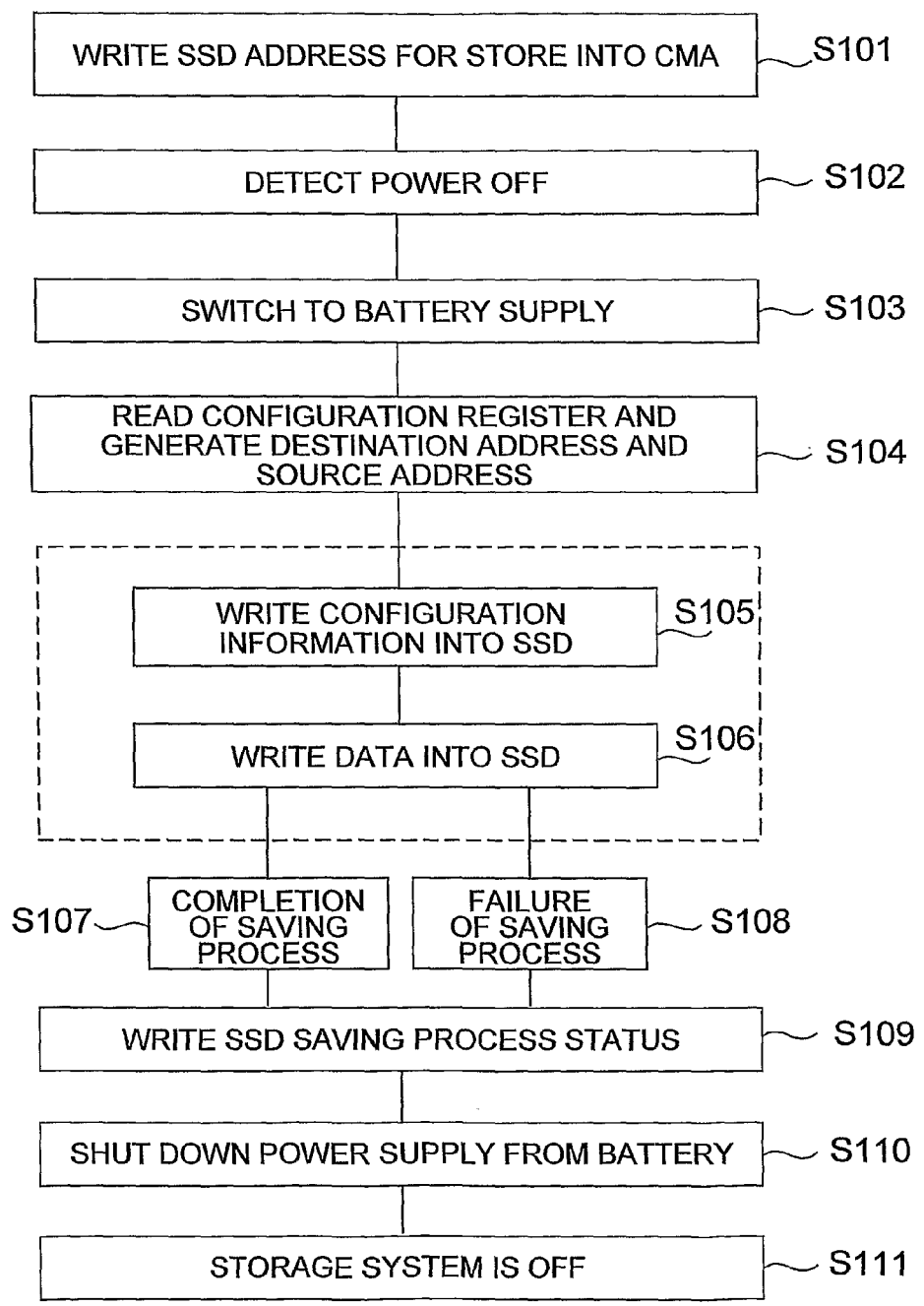
FIG. 9 is a flowchart showing a saving process of writing data into the backup memory in accordance with the first embodiment of this invention.

The destination address information 1100 is generated along with the source address information 1200 shown in FIG. 8 in Step S104 of a saving process shown in FIG. 9. In addition, a pair of the destination address information 1100 and the source address information 1200 constitute backup address information.

The destination address information 1100 is information indicating an address of the transfer destination of the data stored in the cache memory 320, and includes an identifier 1101 of a cache memory package, an identifier 1102 of a backup memory, and an address 1103 in the backup memory.

The identifier 1101 of a cache memory package is a unique identifier of the cache memory package 300 at the transfer destination of the data. The identifier 1102 of a backup memory is a unique identifier of the backup memory 330 at the transfer destination of the data. The address 1103 in the backup memory is an address of the transfer destination of the data in the backup memory 330.

FIG. 8 is an explanatory diagram of the source address information 1200 in accordance with the first embodiment of this invention.

The source address information 1200 is information indicating an address at which data to be transferred is stored in the cache memory 320, and includes an identifier 1201 of a cache memory package, an identifier 1202 of a cache memory, and an address 1203 in the cache memory.

The identifier 1201 of a cache memory package is a unique identifier of the cache memory package 300 in which data to be transferred to the backup memory 330 is stored. The identifier 1202 of a cache memory is a unique identifier of the cache memory 320 in which the data to be transferred is stored. The address 1203 in the cache memory is an address at which the data to be transferred is stored in the cache memory 320.

FIG. 9 is a flowchart showing the saving process of writing data into the backup memory 330 in accordance with the first embodiment of this invention.

First, at startup of the storage system, the microprocessor 410 stores the backup memory address allocation information 1000 into a configuration information storage register within the cache memory adapter 310. It should be noted that, also when the storage system has its configuration changed, the microprocessor 410 generates the SSD address allocation information 1000, and stores the generated SSD address allocation information 1000 into the configuration information storage register (S101). It should be noted that the configuration information storage register is a storage area provided to the cache memory adapter 310.

After that, when the power controller 350 detects shutdown of power (S102), the power is switched over so that the power from the battery 360 is supplied to each component of the cache memory package 300 (S103).

Then, the backup memory controller 340 reads the SSD address allocation information 1000 from the configuration information storage register, and generates backup address information for storing the data stored in the cache memory 320 into the backup memory 330 (S104). The data stored in the cache memory 320 is divided into a predetermined number of blocks (for example, write blocks) to be stored into different backup memories 330, and hence the backup address information (pair of destination address information 1100 and source address information 1200) is generated for each block of the divided data. It should be noted that the data can be divided into not only blocks but also bits, sectors, or other various units.

It should be noted that, in this embodiment, cache data is desirably stored into the backup memories 330 provided to different cache memory packages 300, but instead, the cache data may be divided to be stored into a plurality of backup memories 330 provided to one cache memory package 300.

Further, as described above, in a case where two or more cache memory packages 300 form a pair, the same data is stored in the cache memories 320 of the cache memory packages 300 that form the pair, and hence the data stored in the cache memory 320 of one of the cache memory packages 300 that form the pair may be stored into the backup memory 330.

After that, the backup memory controller 340 reads the configuration information on the storage system from the configuration information storage register, and stores the read configuration information into the configuration information storage area 332 of the backup memory 330. Further, the backup memory controller 340 stores the generated destination address information 1100 and source address information 1200 into the backup address information storage area 331 of the backup memory 330 (S105).

In addition, the backup memory controller 340 reads data from the cache memory 320 on an address basis, and on the basis of the destination address information 1100 corresponding to an address at which the data has been read, specifies an address at which the read data is written into the backup memory 330, and writes the read data into the data storage area 333 of the backup memory 330 at the specified address (S106).

After Step S106 has been executed on all of storage areas (at all of addresses) of the cache memory 320, the saving of the data stored in the cache memory 320 completes normally, which is a completion of the saving process (S107). On the other hand, if Step S106 cannot be executed on a part of storage areas (at part of addresses) of the cache memory 320, the saving of the data stored in the cache memory 320 stops abnormally, which is a failure of the saving process (S108).

After that, the backup memory controller 340 stores a saving process execution status regarding the data stored in the cache memory 320 into the configuration information storage area 332 of the backup memory 330 (S109). The saving process execution status has values such as "normal end", "abnormal end", and "unprocessed". In other words, if the saving of data ends with regard to all of storage areas of the cache memory 320, the saving process execution status becomes "normal end". On the other hand, if the saving of data cannot be executed on a part of storage areas of the cache memory 320, the saving process execution status becomes "abnormal end".

After that, the backup memory controller 340 instructs the power controller 350 to shut down the supply of power from the battery 360. The power controller 350 shuts down the supply of power from the battery 360 to each component of the cache memory package 300 (S110). Then, the storage system stops its operation (S111).

As described above, when the power is abnormal, the data stored in the cache memory 320 is stored into the backup memory 330, which holds stored data even when the power is shut down. Accordingly, it is not necessary to provide a large-capacity battery in order to back up data during long-term shutdown of power, which can reduce the cost of the battery.

Further, the data stored in the cache memory 320 of one of the cache memory packages 300 is divided to be stored into the backup memory 330 of a plurality of cache memory packages 300. Accordingly, the data stored in the original cache memory 320 cannot be restored only with the data stored in one of the backup memories 330, which can ensure the secrecy of data.

For example, according to the conventional technology, in a state in which data is stored in the backup memory 330 (for example, in case of service interruption), the cache memory package 300 (or only backup memory 330) is removed from the storage device, and then the data stored in the removed backup memory 330 is read, thereby allowing data that was stored in the cache memory 320 to be known. However, by dividing, as in this embodiment, the data stored in the cache memory 320 of one of the cache memory packages 300 so as to be stored into the backup memory 330 of a plurality of cache memory packages 300, it is impossible to know the data that was stored in the cache memory 320 even if the data stored in one of the backup memories 330 can be read.

In addition, only the data stored in the cache memory 320 of a part of the cache memory packages 300 (one of cache memory packages 300 that form pair) is stored into the backup memory 330, thereby reducing the amount of cache data to be saved upon the shutdown of power, which can reduce the period of time necessary for the saving process. Accordingly, it is possible to reduce the capacity of the battery used for supplying power after the shutdown of power. Further, it is possible to reduce the period of time necessary for a recovery process of recovering the data stored in the backup memory 330 into the cache memory 320. In addition, a general flash memory has a limited number of rewrites, and hence, in a case where the flash memory is used as the backup memory 330, it is possible to reduce the number of rewrites of the backup memory 330, suppress deterioration of the flash memory, and decrease an exchange cycle of the backup memory 330.

Figure 10:
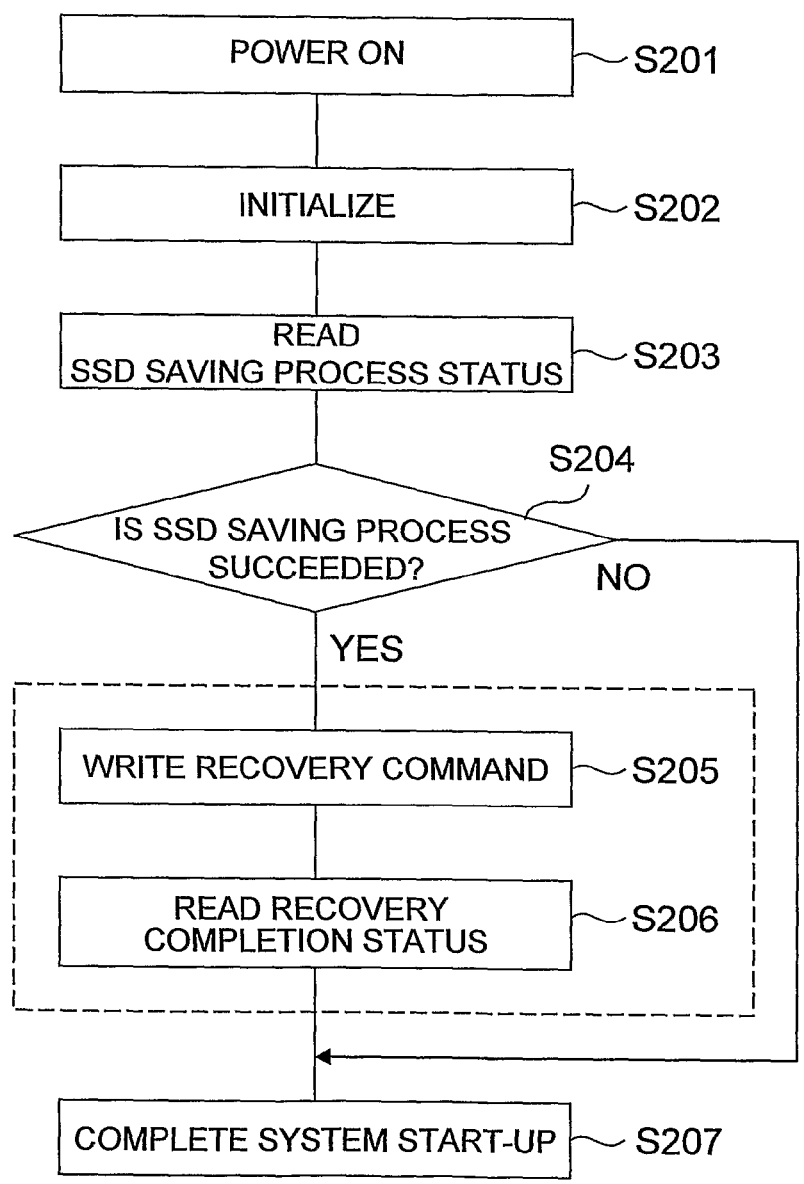
FIG. 10 is a flowchart showing a recovery process of writing data stored in the backup memories into a cache memory in accordance with the first embodiment of this invention.
Figure 11:
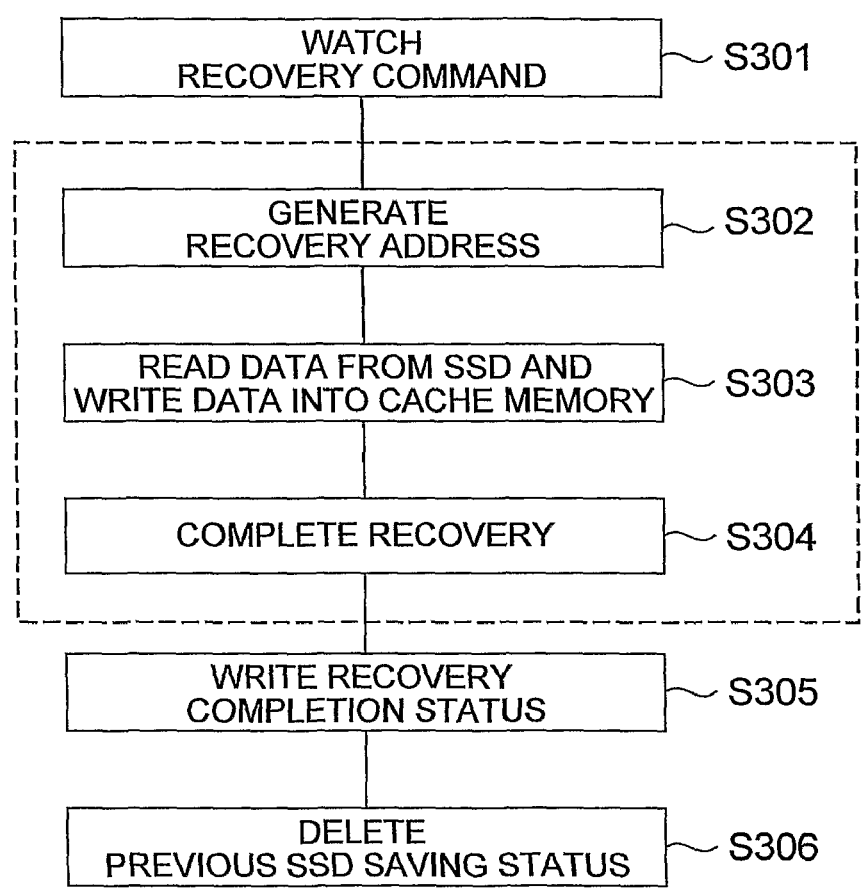
FIG. 11 is a flowchart showing the recovery process of writing data stored in the backup memories into the cache memory in accordance with the first embodiment of this invention.

FIGS. 10 and 11 are flowcharts showing the recovery process of writing the data stored in the backup memories 330 into the cache memory 320 in accordance with the first embodiment of this invention. It should be noted that FIG. 10 shows a process executed by the processor package 400, while FIG. 11 shows a process executed by the cache memory package 300.

First, description will be made of the process shown in FIG. 10 which is executed by the microprocessor 410 of the processor package 400.

When the power switch 610 of the power supply 600 of the storage system is operated, power starts to be supplied to the storage system (S201). After that, the microprocessor 410 reads the configuration information from the configuration information storage area 332 of the backup memory 330, and initializes each component of the storage system (S202).

After that, the microprocessor 410 reads the saving process execution status from the configuration information storage area 332 of the backup memory 330 (S203). Then, if the read saving process execution status is "normal end" (YES in Step S204), the procedure advances to Step S205 to recover the cache data into the cache memory 320. On the other hand, if the read saving process execution status is not "normal end" (NO in Step S204), the procedure advances to Step S207 to end a device startup process without the need to recover the cache data into the cache memory 320.

In other words, if the read saving process execution status is not "normal end", the data stored in the backup memory 330 is not the one that has been obtained by normally backing up the cache data that was stored in the cache memory 320, and hence the cache memory 320 is judged to be in a volatile state, which leads to the startup of the storage system.

In Step S205, the microprocessor 410 issues an instruction to recover the cache data. To be specific, the microprocessor 410 writes a recovery command into a predetermined area (register) of the cache memory adapter 310. The written recovery command is read by the cache memory package 300 (Step S301 of FIG. 11).

After that, the microprocessor 410 watches the end of the recovery process. To be specific, the microprocessor 410 uses a polling method to watch recovery completion status information stored in the predetermined area (internal register) of the cache memory adapter 310 (S206).

When the microprocessor 410 detects that the recovery process has come to an end on the basis of a value (recovery process execution status) of an inner register written in Step S305 of FIG. 11, the device startup process comes to an end (S207).

Next, description will be made of the process shown in FIG. 11 which is executed by the backup memory controller 340 of the cache memory package 300.

When the backup memory controller 340 is started and initialized, the backup memory controller 340 waits for the instruction to recover the cache data (issued in Step S205 of FIG. 10) from the microprocessor 410 (S301). Then, if the backup memory controller 340 receives the instruction to recover the cache data (if the recovery command is written into the predetermined area (internal register of the backup memory controller 340)), the backup memory controller 340 generates recovery-purpose address information for storing the data stored in the backup memory 330 into the cache memory 320 (S302). To be specific, the destination address information 1100 as shown in FIG. 7 and the source address information 1200 as shown in FIG. 8, which have been stored in Step S105, are read from the backup address information storage area 331 of the backup memory 330. In other words, in the recovery-purpose address information, the destination address information 1100 is set as a read source address, and the source address information 1200 is set as a write destination address.

Subsequently, the backup memory controller 340 read the saved data from the backup memory 330 according to the generated recovery-purpose address information (destination address information 1100), and store the read data into the cache memory 320 according to the generated recovery-purpose address information (source address information 1200) (S303).

Then, after data has been written for all of the storage areas of the cache memory 320, the backup memory controller 340 completes the data recovery into the cache memory 320 (S304).

Subsequently, the backup memory controller 340 stores the recovery process execution status for the data recovery into the cache memory 320, into the configuration information storage area 332 of the backup memory 330 (S305). The recovery process execution status has values such as "normal end" and "abnormal end". For example, if the data recovery has been completed for all of the storage areas of the cache memory 320, the recovery process execution status becomes "normal end".

After that, the backup memory controller 340 deletes the saving process execution status regarding the data written in Step S109 of FIG. 9 (S306). This is because, if the saving process execution status regarding the data cannot be stored next time power is shut down, the storage system is prevented from starting with erroneous information at the subsequent startup.

Figure 12:
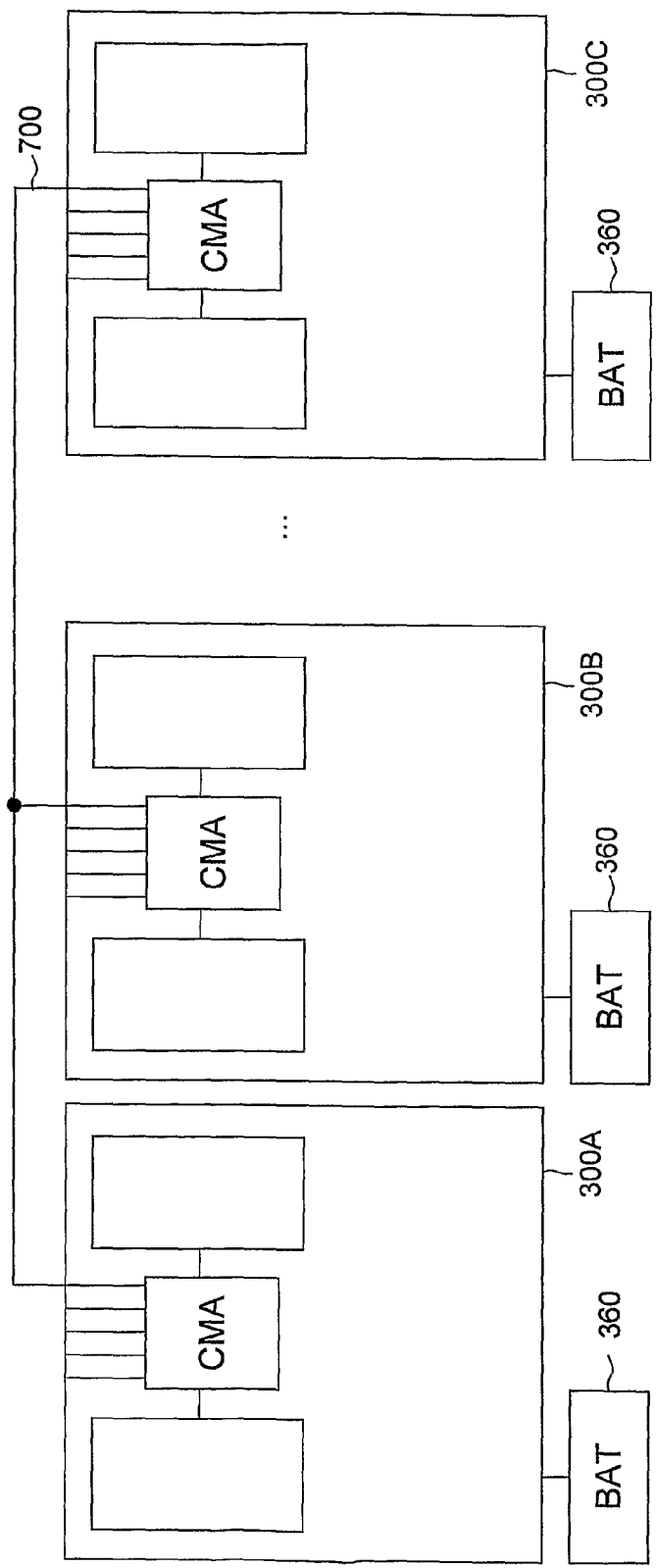
FIG. 12 is a block diagram showing a configuration of a storage system around a switch unit in accordance with a modified example of the first embodiment of this invention.

FIG. 12 is a block diagram showing a configuration of a storage system around the switch package 500 in accordance with a modified example of the first embodiment of this invention.

As described above, in the storage system according to this embodiment, the data stored in the cache memory 320 is written into the backup memory 330 upon the shutdown of power. Therefore, even after the power supplied to the storage system has been shut down, data needs to be transferred between the cache memory packages 300.

In the modified example shown in FIG. 12, in addition to the switch package 500 (not shown), there is provided a communication line 700 for transferring data between the cache memory packages 300 during the shutdown of power. For example, a PCI Express can be used as the communication line 700.

Accordingly, in the same manner as the case shown in FIG. 4 where the switch package 500 is operated by the power supplied from the battery 510, data can be transferred between the cache memory packages 300 for a predetermined period after the power supplied to the storage system has been shut down. Therefore, this modified example eliminates the need to provide the switch package 500 with the battery 510.

Second Embodiment

In the first embodiment described above, the backup memory 330 is used only when the power is shut down, but is not used during the normal operation. However, in the second embodiment, in addition to the operation upon the shutdown of power according to the first embodiment described above, the backup memory 330 is used as a secondary cache during the normal operation.

Figure 13:
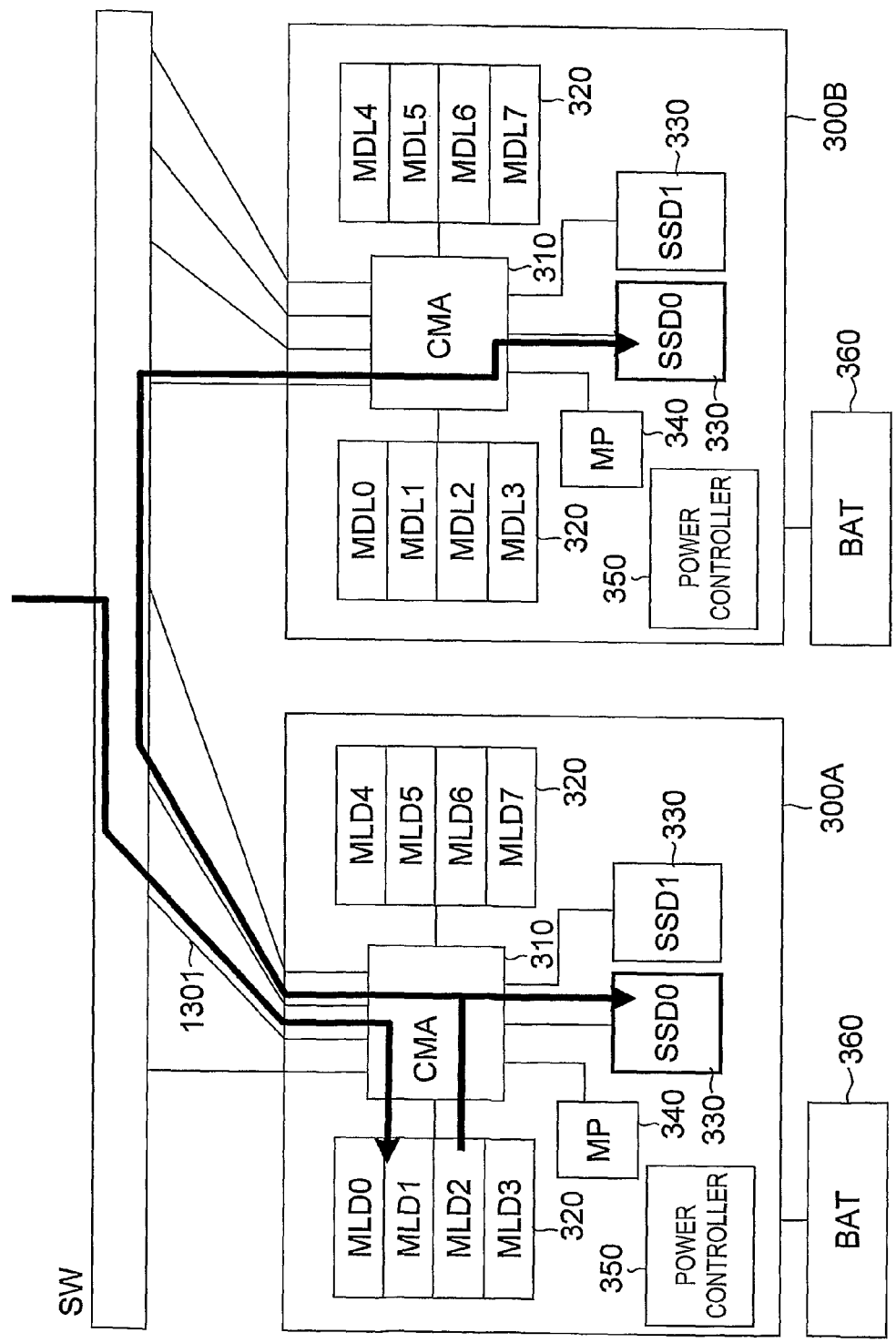
FIG. 13 is an explanatory diagram of an operation of a backup memory during a normal operation in accordance with a second embodiment of this invention.

FIG. 13 is an explanatory diagram of the operation of the backup memory 330 during the normal operation in accordance with the second embodiment of this invention.

When the configuration information and control information on the device are received from the processor package 400, the cache memory package 300 stores the received configuration information and control information into the cache memory 320 as well as user data written from the host computer 10.

When the configuration information and the control information are stored into the cache memory 320, the backup memory controller 340 divides the configuration information and the control information that are stored in the cache memory 320, and stores the divided data into the backup memories 330 of a plurality of cache memory packages 300.

The configuration information and the control information that are stored in the backup memories 330 are held even during the shutdown of power, and therefore do not need to be stored onto the disk drive 20. In this case, after having been stored into the backup memories 330, the configuration information and the control information become clean data, and can be deleted from the cache memory 320.

In a case where the backup memory 330 and the disk drive 20 are configured by a non-volatile semiconductor storage device (such as flash memory) and a magnetic disk, respectively, the backup memory 330 can have data input to/output from the disk drive 20 at high speed, which can improve accessibility to the configuration information and the control information.

It should be noted that the configuration information and the control information that are stored in the backup memories 330 may be stored onto the disk drive 20. In this case, after having been stored onto the disk drive 20, the configuration information and the control information become clean data, and can be deleted from the cache memory 320.

The configuration information and the control information that are stored in the cache memory 320 do not need to be processed at high speed in the cache memory package 300 unlike the user data written from the host computer 10. Therefore, even if the configuration information and the control information that are stored in the cache memory 320 are stored into the backup memory 330 during the normal operation, little influence is exerted upon the response to the host computer 10.

The configuration information and the control information may be divided into a predetermined number of units (for example, bits, sectors, or blocks) as in the manner described above in the first embodiment that the data stored in the cache memory 320 is divided upon the shutdown of power.

Figure 14:
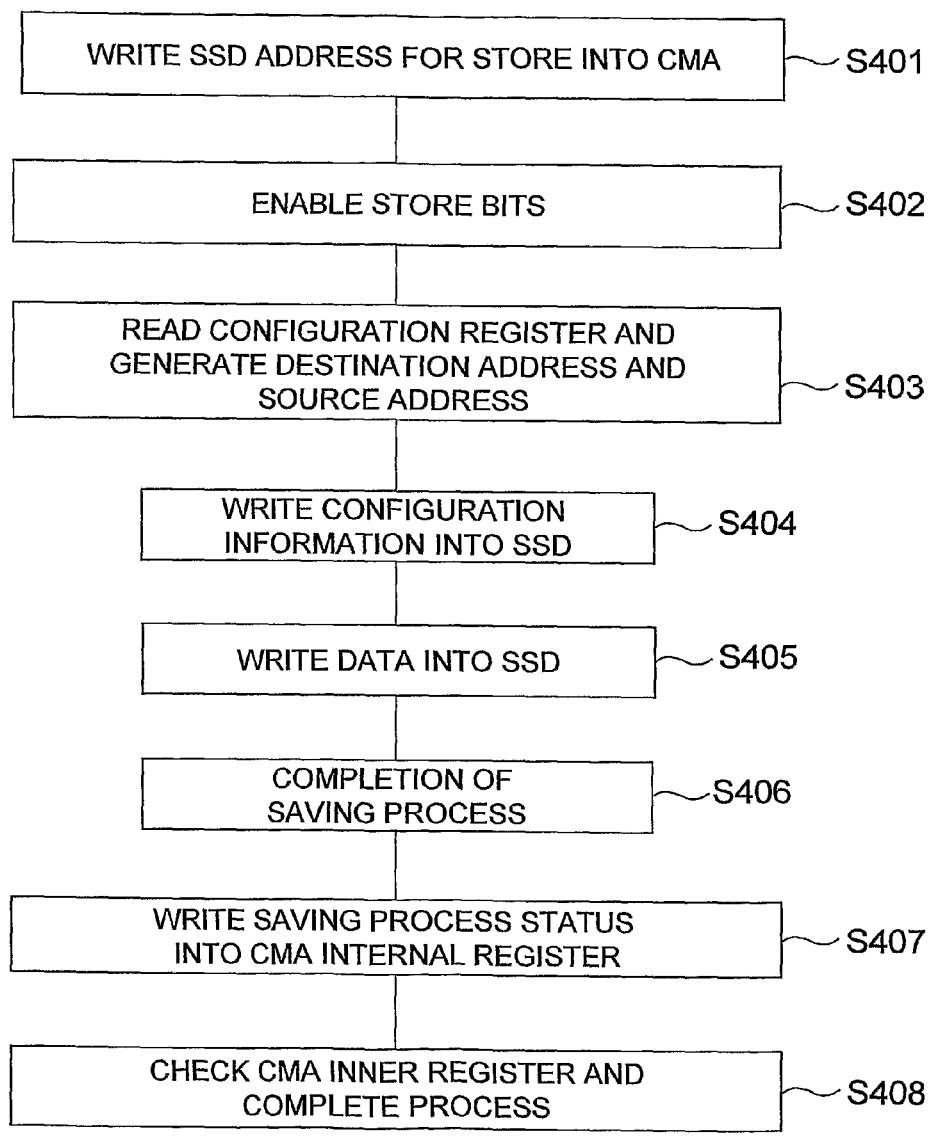
FIG. 14 is a flowchart showing a process of writing secondary cache data into the backup memory in accordance with the second embodiment of this invention.

FIG. 14 is a flowchart showing a process of writing secondary cache data into the backup memory 330 in accordance with the second embodiment of this invention.

First, the microprocessor 410 stores the SSD address allocation information 1000 into the configuration information storage register of the cache memory adapter 310. In the second embodiment, for each of the backup memories 330, an address at which the configuration information is stored into the configuration information storage area 332 is set, and an address at which the control information is stored into the data storage area 333 is set (S401).

After that, the microprocessor 410 writes data into a predetermined area of the backup memory controller 340 (for example, enables store bit of backup memory controller 340). When the store bit is enabled, the backup memory controller 340 stores the configuration information and the control information into the backup memory 330 (S402).

Subsequently, if the backup memory controller 340 confirms that the store bit has been enabled, the backup memory controller 340 reads the configuration information from the configuration information storage register, generates the backup address information that stores the read configuration information, and further generates the backup address information that stores the read control information (S403). The configuration information and the control information that are stored in the cache memory 320 are divided into a predetermined number of blocks (for example, write blocks) to be stored into different backup memories 330, and hence the backup address information (pair of destination address information 1100 and source address information 1200) is generated for each item of the divided data. It should be noted that, also in the second embodiment, the data can be divided into not only blocks but also bits, sectors, or other various units.

After that, the backup memory controller 340 stores the configuration information read from the configuration information storage register into the configuration information storage area 332 of the backup memory 330. Further, the backup memory controller 340 stores the destination address information 1100 and the source address information 1200 that are included in the generated configuration information into the backup address information storage area 331 of the backup memory 330 (S404).

Further, the backup memory controller 340 stores the control information into the data storage area 333 of the backup memory 330. In addition, the backup memory controller 340 stores the destination address information 1100 and the source address information 1200 that are included in the generated control information into the backup address information storage area 331 of the backup memory 330 (S405).

After Step S404 has been executed on all of the configuration information storage registers (all of configuration information) and control information of the cache memories 320, the storing of the configuration information and the control information that are stored in the cache memory 320 into the backup memory 330 is completed (S406).

After that, the backup memory controller 340 stores the saving process execution status regarding the configuration information and the control information that are stored in the cache memory 320 into a predetermined area (inner register of backup memory controller 340) (S407), and the backup memory controller 340 ends the saving process for the control information.

On the other hand, the microprocessor 410 watches the end of the recovery process at such intervals as to exert no influence on the response. To be specific, the microprocessor 410 uses the polling method to watch information on the saving process execution status stored in the predetermined area (inner register of backup memory controller 340). Then, upon detection of the end of the recovery process based on the value (information on saving process execution status) of the inner register, the microprocessor 410 ends the saving process for the control information (S408).

As has been described above, according to the second embodiment of this invention, the configuration information and the control information that are stored in the cache memory 320 are stored into the backup memory 330 during the normal operation, and hence it is possible to reduce the amount of data to be saved upon the shutdown of power, which can reduce the period of time necessary for the saving process. It should be noted that the second embodiment has been described by taking the example case where both the configuration information and the control information are stored into the backup memory 330, but only one of the configuration information and the control information may be stored into the backup memory 330.

Further, in the second embodiment, the configuration information and the control information are described as examples of such data as to exert no influence on the response to the host computer 10, but the second embodiment can be applied to other such data as to exert no influence on the response to the host computer 10.

Further, in the case where the backup memory 330, in which the configuration information and the control information are stored, and the disk drive 20 are configured by a non-volatile semiconductor storage device (such as flash memory) and a magnetic disk, respectively, it is possible to improve the access speed with respect to the configuration information and the control information that are stored in the backup memories 330. In addition, the configuration information and the control information are divided to be stored in a plurality of backup memories 330, and hence it is possible to further improve the accessibility than in the case where the configuration information and the control information are stored in one backup memory 330.

INDUSTRIAL APPLICABILITY

This invention can be applied to a storage system including a cache memory, in which data stored in the cache memory does not volatilize (disappear) even when power is shut down.

The invention claimed is:

1. A storage system, which is coupled to a computer, comprising:
    a storage device for storing data for which write is requested by the computer;
    a controller for controlling transfer of data in the storage system;
    a plurality of cache memory units for temporarily storing data to be stored into the storage device; and
    a connecting unit for connecting at least the plurality of cache memory units,
        each of the plurality of cache memory units comprising:
            a cache memory for storing data;
            an auxiliary storage device for holding data even after shutdown of power; and
            a cache controller for controlling an input/output of data to/from the cache memory and the auxiliary storage device,
    wherein the cache controller is configured to store data stored in the cache memory, which is divided into a plurality of parts, into a plurality of the auxiliary storage devices included in the plurality of cache memory units,
    wherein:
    the plurality of cache memory units comprise:
        a first cache memory unit; and
        a second cache memory unit for storing the same data as stored in the first cache memory unit; and
    the cache controller is configured to:
    store data stored in the cache memory of the first cache memory unit into the plurality of the auxiliary storage devices; and
    prevent to store data stored in the cache memory of the second cache memory unit into the plurality of the auxiliary storage devices.

2. The storage system according to claim 1, further comprising a watching unit for watching power supplied to the plurality of cache memory units,
    wherein the cache controller is configured to store the data stored in the cache memory into the plurality of the auxiliary storage devices in case of which the watching unit detects an abnormality in the power supplied to the plurality of cache memory units.

3. The storage system according to claim 1, wherein each of the plurality of the auxiliary storage devices comprises a non-volatile memory for holding data even after the shutdown of the power.

4. The storage system according to claim 1, further comprising an auxiliary connecting unit for connecting the plurality of cache memory units, wherein:
    the connecting unit is configured to stop the transfer of data when power supplied to the connecting unit stops; and
    the auxiliary connecting unit is configured to enable the transfer of data between the plurality of cache memory units when the power supplied to the connecting unit stops.

5. The storage system according to claim 1, further comprising a watch unit for watching power supplied to the plurality of cache memory units,
    wherein the cache controller is configured to stores at least one of configuration information and control information stored in the cache memory, which is divided into a plurality of parts, into the plurality of the auxiliary storage devices before the watch unit detects an abnormality in the power supplied to the plurality of cache memory units.

6. A data management method, which is used for a storage system, the storage system including: a storage device for storing data for which write is requested by a computer; a controller for controlling transfer of data in the storage system; a plurality of cache memory units for temporarily storing data to be stored into the storage device; and a connecting unit for connecting at least the plurality of cache memory units, each of the plurality of cache memory units including: a cache memory for storing data; an auxiliary storage device for holding data even after shutdown of power; and a cache controller for controlling an input/output of data to/from the cache memory and the auxiliary storage device, the data management method including the steps of:

reading, by the cache controller, the data stored in the cache memory;

dividing, by the cache controller, the read data into a plurality of parts; and controlling, by the cache controller, each of the parts of the divided data to be stored into any one of a plurality of the auxiliary storage devices included in the plurality of cache memory units, wherein:

the plurality of cache memory units include:

a first cache memory unit; and a second cache memory unit for storing the same data as stored in the first cache memory unit; and the data management method further including the steps of:

storing, by the cache controller, data stored in the cache memory of the first cache memory unit into the plurality of the auxiliary storage devices; and preventing, by the cache controller, to store data stored in the cache memory of the second cache memory unit from being stored into the plurality of the auxiliary storage devices.

7. The data management method according to claim 6, further including the step of storing, by the cache controller, the data stored in the cache memory into the plurality of the auxiliary storage devices in the case of which an abnormality is detected in power supplied to the plurality of cache memory units.

8. The data management method according to claim 6, further including the step of storing, by the cache controller, at least one of configuration information and control information stored in the cache memory, which is divided into a plurality of parts, into the plurality of the auxiliary storage devices before an abnormality is detected in power supplied to the plurality of cache memory units.

* * * * *